(12) United States Patent
Mendiratta et al.

(10) Patent No.: US 10,193,931 B2
(45) Date of Patent: Jan. 29, 2019

(54) SESSION INITIATION PROTOCOL CALL PRESERVATION BASED ON A NETWORK FAILURE

(71) Applicant: Avaya Inc., Santa Clara, CA (US)

(72) Inventors: Harsh V. Mendiratta, East Brunswick, NJ (US); Tibor Lukac, Superior, CO (US); Stephen Andrew Baker, Arvada, CO (US)

(73) Assignee: Avaya Inc., Santa Clara, CA (US)

( * ) Notice: Subject to any disclaimer, the term of this patent is extended or adjusted under 35 U.S.C. 154(b) by 138 days.

(21) Appl. No.: 15/087,790

(22) Filed: Mar. 31, 2016

(65) Prior Publication Data

US 2017/0289201 A1 Oct. 5, 2017

(51) Int. Cl.
*G06F 15/16* (2006.01)
*H04L 29/06* (2006.01)
*H04L 29/14* (2006.01)

(52) U.S. Cl.
CPC ...... *H04L 65/1006* (2013.01); *H04L 65/1069* (2013.01); *H04L 65/1083* (2013.01); *H04L 69/40* (2013.01)

(58) Field of Classification Search
CPC . H04L 65/1006; H04L 69/40; H04L 65/1083; H04L 65/1069; H04L 29/06
See application file for complete search history.

(56) References Cited

U.S. PATENT DOCUMENTS

| 2006/0294245 | A1 | 12/2006 | Raguparan et al. |
| 2007/0019540 | A1* | 1/2007 | Biswas ............. H04L 29/12094 370/217 |
| 2008/0013447 | A1 | 1/2008 | Lauber |
| 2008/0069065 | A1* | 3/2008 | Wu ........................ H04W 36/08 370/340 |
| 2009/0177785 | A1* | 7/2009 | Reid ................. H04L 29/06027 709/228 |
| 2010/0098093 | A1 | 4/2010 | Ejzak |
| 2010/0215037 | A1 | 8/2010 | Long et al. |
| 2010/0238928 | A1 | 9/2010 | Prouvost et al. |
| 2010/0293240 | A1 | 11/2010 | Lee et al. |

(Continued)

OTHER PUBLICATIONS

Okumura et al. "Session Initiation Protocol (SIP) Usage of the Offer/Answer Model," IETF Trust, Aug. 2011, RFC 6337, 33 pages.

(Continued)

*Primary Examiner* — Cheikh T Ndiaye
(74) *Attorney, Agent, or Firm* — Sheridan Ross P.C.

(57) ABSTRACT

To reestablish a media stream, first and second SIP INVITE with replaces header messages are received by an application from a first and second communication endpoint respectively. The SIP INVITE with replaces header messages comprises a first Session Description Protocol (SDP) offer that are each based a change of a network address used by the respective communication endpoint. In response to receiving one or both of the SIP INVITE with replaces header messages, the application, depending on implementation, sends one of a first SIP 200 OK message with a fabricated SDP answer or sends a SIP 480 temporarily unavailable message that does not comprise a SDP offer. This initiates the process of reestablishing the media stream on new network without dropping the communication session.

20 Claims, 4 Drawing Sheets

(56) References Cited

U.S. PATENT DOCUMENTS

| | | | |
|---|---|---|---|
| 2011/0191487 A1* | 8/2011 | Ziems | H04L 29/06027 |
| | | | 709/231 |
| 2013/0021998 A1* | 1/2013 | Shatsky | H04W 28/26 |
| | | | 370/329 |
| 2014/0095723 A1 | 4/2014 | Ezell et al. | |
| 2015/0131526 A1 | 5/2015 | Noldus et al. | |
| 2016/0150455 A1* | 5/2016 | Suryavanshi | H04W 36/245 |
| | | | 455/436 |
| 2016/0380967 A1* | 12/2016 | Moore | H04L 65/1069 |
| | | | 709/217 |
| 2017/0289200 A1 | 10/2017 | Mendiratta et al. | |

OTHER PUBLICATIONS

Rosenberg et al. "An Offer/Answer Model with the Session Description Protocol (SDP)," The Internet Society, Jun. 2002, RFC 3264, 26 pages.

Official Action for U.S. Appl. No. 15/087,769, dated Nov. 30, 2017 14 pages.

Official Action for U.S. Appl. No. 15/087,769, dated Jun. 13, 2018 18 pages.

* cited by examiner

SESSION INITIATION PROTOCOL CALL PRESERVATION BASED ON A NETWORK FAILURE

FIELD

The disclosure relates generally to Session Initiation Protocol (SIP) communications and particularly to SIP call preservation.

BACKGROUND

When a network that communication devices are connected to fails, existing communications on the failed network are dropped. If a communication session is active between two communication devices when the failure occurs, a user will typically have to wait until the communication network recovers. Alternatively, the user may try using another network to reestablish the communication session. This can result in frustration to the user because it may take time for the network to recover or will require additional time to try and use a different network.

SUMMARY

These and other needs are addressed by the various embodiments and configurations of the present disclosure. To reestablish a media stream, first and second SIP INVITE with replaces header messages are received by an application from a first and second communication endpoint respectively. The SIP INVITE with replaces header messages comprises a first Session Description Protocol (SDP) answer that are each based a change of a network address used by the respective communication endpoint. In response to receiving one or both of the SIP INVITE with replaces header messages, the application, depending on implementation, sends one of a first SIP 200 OK message with a fabricated SDP answer or sends a SIP 480 temporarily unavailable message that does not comprise a SDP answer. This initiates the process of reestablishing the media stream on new network without dropping the communication session.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112 Paragraph 6. Accordingly, a claim incorporating the term "means" shall cover all structures, materials, or acts set forth herein, and all of the equivalents thereof. Further, the structures, materials or acts and the equivalents thereof shall include ail those described in the summary, brief description of the drawings, detailed description, abstract, and claims themselves.

This document describes SIP messages defined in the SIP standard, such as those described in Network Working Group Request for Comments (RFC) 3261 entitled "SIP: Session Initiation Protocol" June 2002 and Network Working Group Request for Comments (RFC) 3891 entitled "The Session Initiation Protocol (SIP) "Replaces" Header, September 2004, which are incorporated by reference in their entirety.

DETAILED DESCRIPTION

Figure 1:
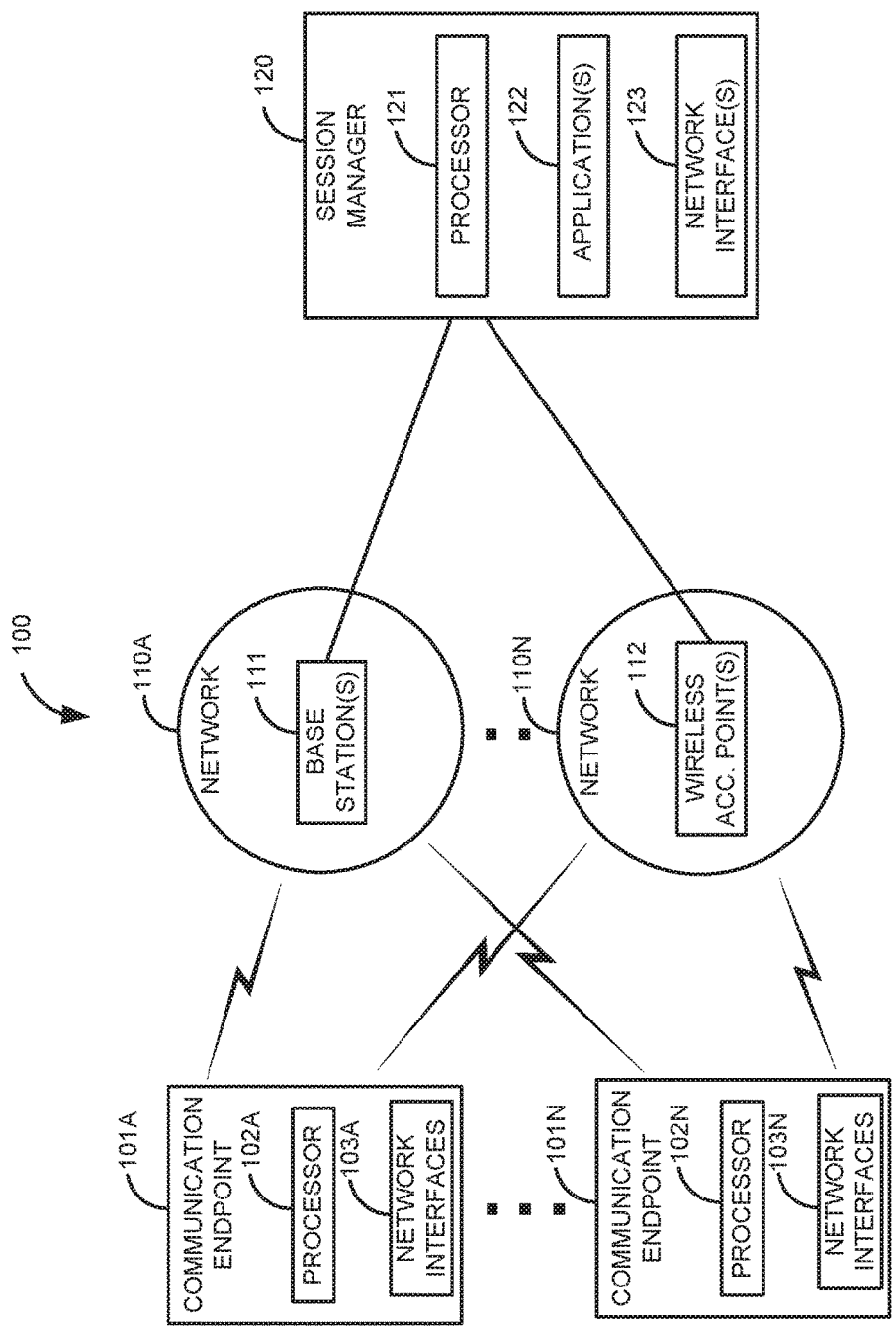
FIG. 1 is a block diagram of a first illustrative system for preserving SIP communications.

FIG. 1 is a block diagram of a first illustrative system 100 for preserving SIP communications. The first illustrative system 100 comprises communication endpoints 101A-101N, networks 110A-110N, and a session manager 120.

The communication endpoints 101A-101N can be or may include any device that can communicate on the networks 110A-110N, such as a Personal Computer (PC), a telephone, a video system, a cellular telephone, a Personal Digital Assistant (PDA), a tablet device, a notebook device, a smart phone, and the like. As shown in FIG. 1, any number of communication endpoints 101A-101N may be connected to the networks 110A-110N.

The communication endpoints 101A-101N further comprises processors 102A-102N and network interfaces 103A-103N. The processors 102A-102N may be any hardware processor 102 that can process software/firmware, such as a microprocessor, a microcontroller, an application specific processor, a Digital Signaling Processor (DSP) and/or the like. The processors 102A-102N may comprise multiple processors 102. The communication endpoints 101A-101N may comprise a SIP User Agent (UA). A SIP UA is a module that can communicate via SIP to the session manager 120/applications 122.

The network interfaces 103A-103N can be or may include any hardware that may use software/firmware to send and received communications from any of the networks 110A-110N. The network interfaces 103A-103N may support different types of hardware interfaces, such as wired interfaces, wireless interfaces, optical interfaces, and/or the like. The network interfaces 103A-103N may support a variety of protocols, such as Ethernet, 802.11, Token Ring, Sonnet, Global System for Mobile (GSM), WiFi, cellular, IPv4, IPv6, 3G, 4G, and/or the like. In FIG. 1, communication endpoints 101A-10N may each comprise at least two different network interfaces 103 to communicate on the networks 110A-110N. The network interfaces 103 on an individual communication endpoint 101 may comprise separate hardware interfaces 103. Alternatively, the network interfaces 103 may comprise a single hardware network interface 103 that uses two different protocol stacks (i.e., two separate software network interfaces using one hardware interface 103).

The networks 110A-110N can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The networks 110A-110N can use a variety of electronic protocols, such as Ethernet, Internet Protocol (IP), Session Initiation Protocol (SIP), Integrated Services Digital Network (ISDN), and the like. Thus, the networks 110A-110N are electronic communication networks configured to carry messages via packets and/or circuit switched communications.

In FIG. 1, the networks 110A-110N are shown as wireless networks for illustrative purposes. However, in some embodiments, one or both of the networks 110A-110N may be wired networks.

The network 110A comprises one or more base station(s) 111. The base station 111 can be or may include any hardware coupled with software that allows that allows the communication endpoints 101A-101N to communicate on the network 110A, such as a wireless base station, a cellular base station, and/or the like.

The network 110N comprises one or more wireless access points 112. The wireless access point 112 can be or may include any hardware coupled with software that allows the communication endpoints 101A-101N to communicate on the network 110N, such as a WiFi access point, an 802.11 access point, a wireless router, and/or the like.

The session manager 120 can be or may include any hardware coupled with software that manages communications on the networks 110A-110N, such as a Private Branch Exchange (PBX), a central office switch, a communications server, a video router, a communication manager, a SIP proxy server, and/or the like. The session manager 120 further comprises a processor 121 application(s) 122, and network interface(s) 123.

The processor 121 may be any hardware processor 102 that can process software/firmware, such as a microprocessor, a microcontroller, an application specific processor, a Digital Signaling Processor (DSP) and/or the like. The processor 121 may comprise multiple processors 121.

The application(s) 122 can be any communication application 122 that can be used to manage a communication session between the communication endpoints 101A-101N, such as, a call recording application, a call forwarding application, a call forking application, a voice recognition application, a conferencing application, and/or the like. The application(s) 122 may comprise one or more SIP Back-to-Back User Agents (B2BUA).

The network interface(s) 123 may support different types of hardware interfaces, such as wired interfaces, wireless interfaces, optical interfaces, and/or the like. The network interface(s) 123 may support a variety of protocols, such as Ethernet, 802.11, Token Ring, Sonnet, Global System for Mobile (GSM), WiFi, cellular, IPv4, IPv6, 3G, 4G, and/or the like.

Figure 2:
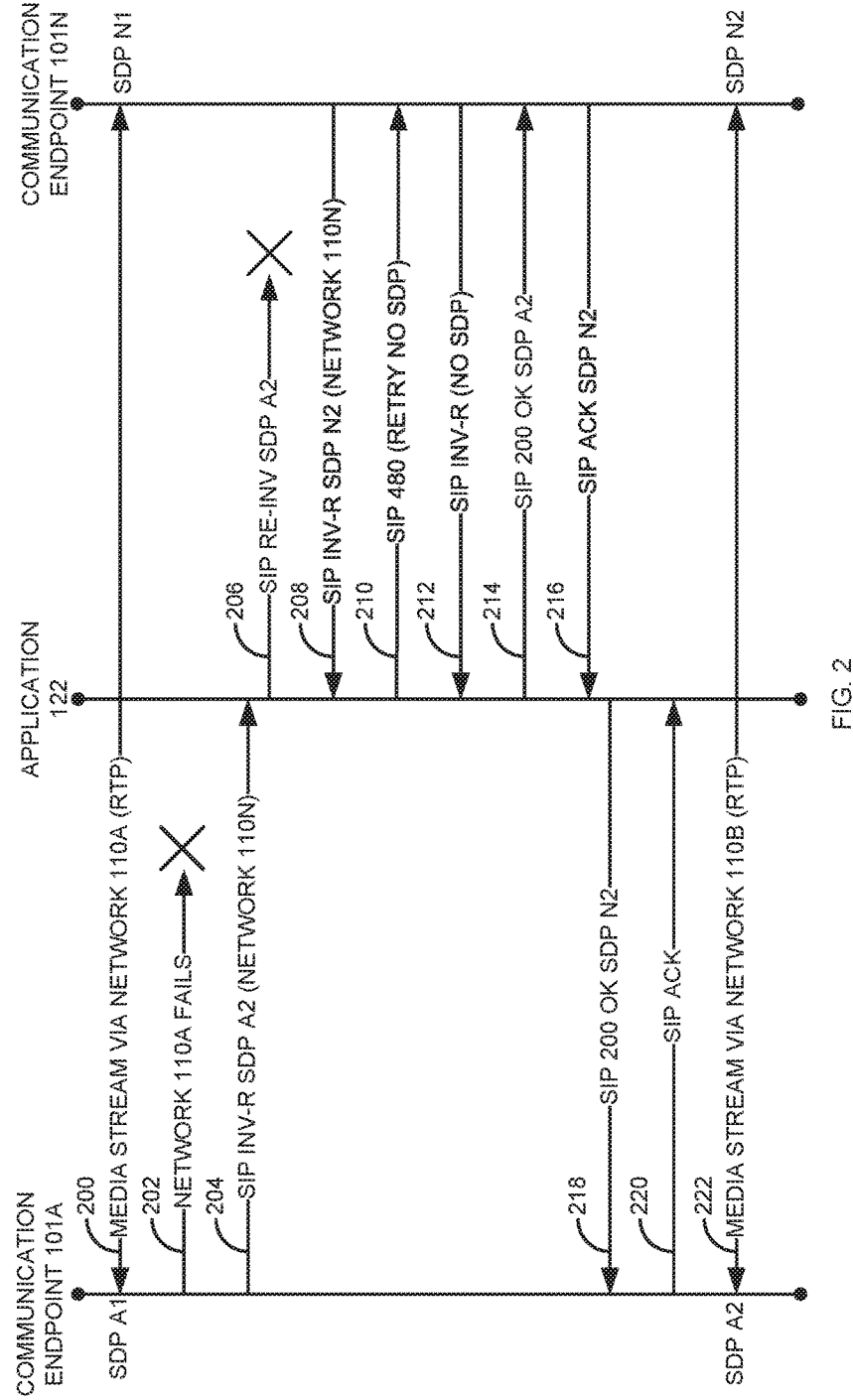
FIG. 2 is a flow diagram of a first process for preserving SIP communications.
Figure 3:
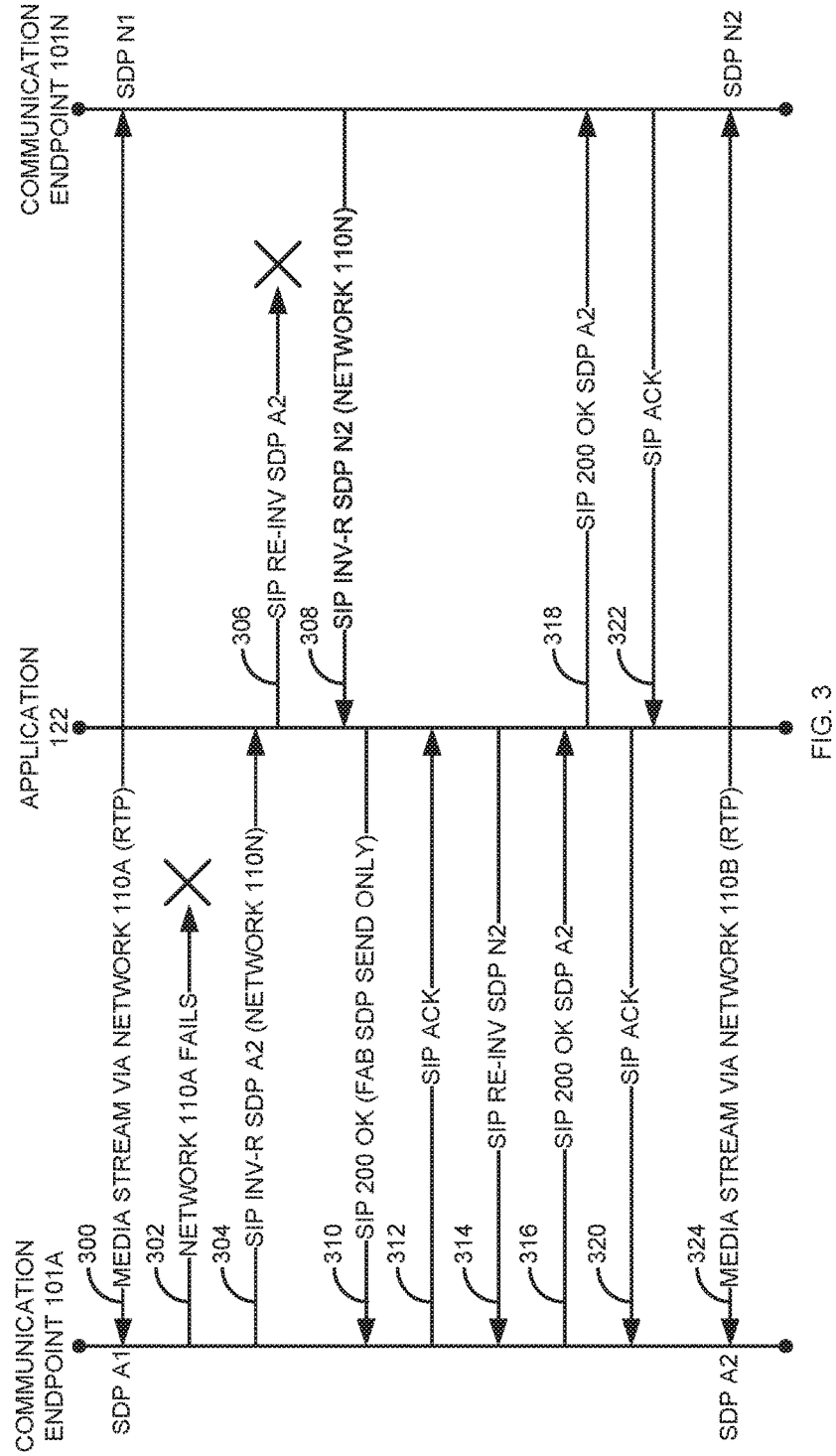
FIG. 3 is a flow diagram of a second process for preserving SIP communications.
Figure 4:
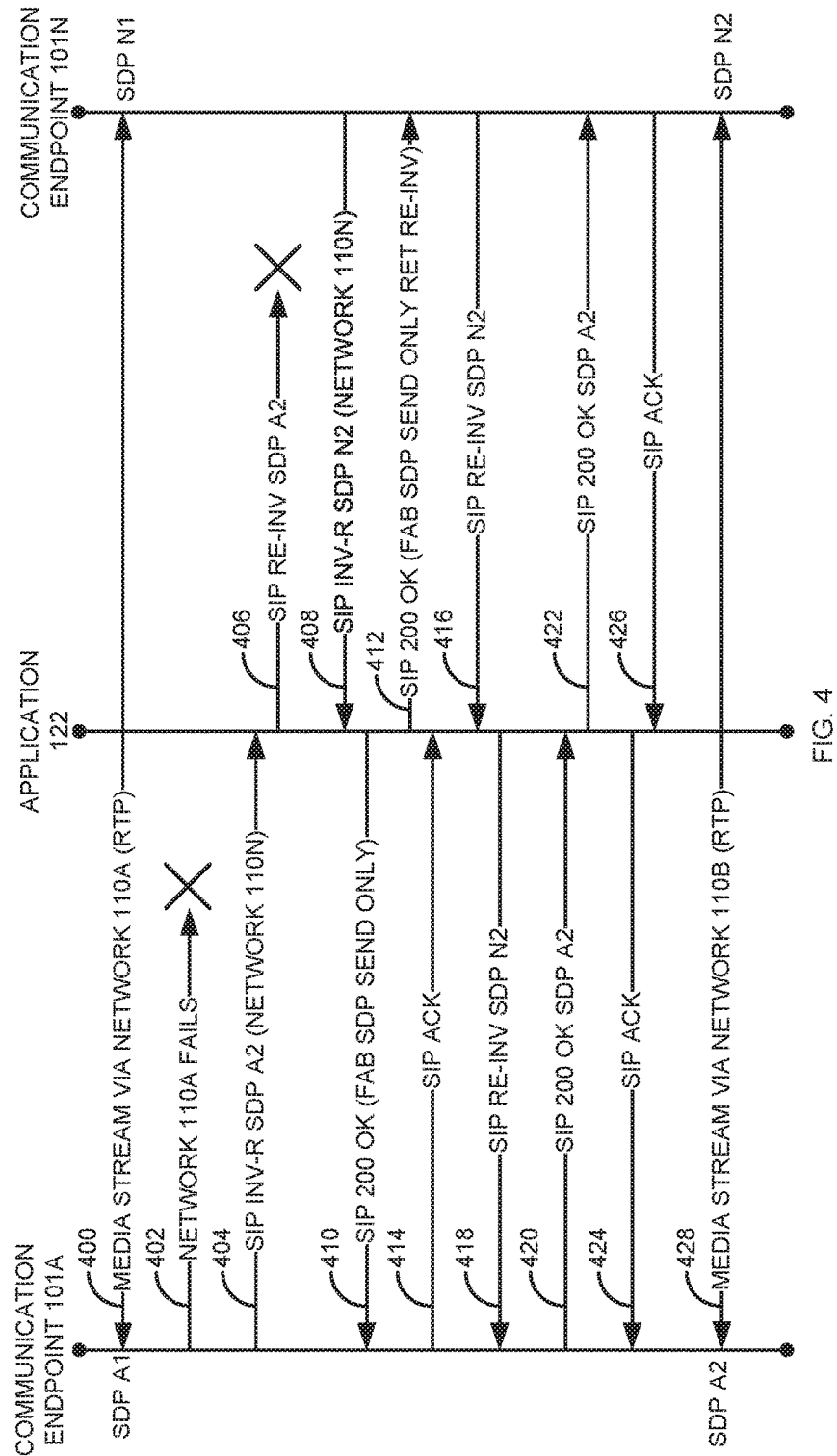
FIG. 4 is a flow diagram of a third process for preserving SIP communications.

FIG. 2 is a flow diagram of a first process for preserving SIP communications. Illustratively, the communication endpoints 101A-101N, the network interfaces 103A-103N, the base station(s) 111, the wireless access point(s) 112, the session manager 120, the application(s) 122, and the network interface(s) 123 are stored-program-controlled entities, such as a computer or processor, which performs the method of FIGS. 2-4 and the processes described herein by executing program instructions stored in a computer readable storage medium, such as a memory or disk. Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

A media stream 200 is established between the communication endpoint 101A and the communication endpoint 101N on the network 110A. For example, a signaling channel voice or video is established on the network 110A between the communication endpoint 101A, the application 122 (e.g., a SIP B2BUA), and the communication endpoint 101N using SIP (e.g., using standard SIP messaging). After the signaling channel is established, the media stream 200 is established using Real-Time Protocol (RTP). The communication endpoints 101A and 101N use Session Description Protocol (SDP) to negotiate the RTP media stream 200. In this example, the communication endpoint 101A uses SDP A1. The SDP A1 includes the IP address of the communication endpoint 101A on the network 110A. The communication endpoint 101N uses SDP N1. The SDP N1 includes the IP address of the communication endpoint 101N on the network 110A.

The media stream 200 is shown in FIG. 2 as being a direct communication between the communication endpoint 101A and the communication endpoint 101N. However, in some embodiments, the media stream 200 may flow between the communication endpoint 101A and the communication endpoint 101N via the application 122. For example, if the application 122 is a call recording application, the media stream 200 will flow through the application 122.

The network 110A fails in step 202 (or alternatively, the session manager 120 fails). The network 110A can fail in various ways. For example, the base station 111 may fail, the link between the base station 111 and the session manager 120 may fail, the network interface 123 on the session manager 120 connected to the base station 111 may fail, and/or the like. The failure of the network 110A, in step 202, causes the SIP signaling channel between the communication endpoints 101A-101N to fail because the communication endpoints 101A-101N can no longer communicate by sending SIP messaging to the session manager 120. In addition, the media stream 200 will likely fail.

Since the communication endpoints 101A-101N can communicate on both the networks 110A-110N, the communication endpoint 101N tries to reestablish the communication channel (both signaling and media) between the communication endpoint 101A and the communication endpoint 101N. In this example, since the application 122 was part of the communication session, the communication endpoint 101A sends, on the network 110N, a SIP INVITE with replaces header message to the application 122 in step 204. The SIP INVITE with replaces header message of step 204 includes a new SDP A2. The new SDP A2 includes the IP address of the communication endpoint 101A on the network 110N. The IP address of the communication endpoint 101A in the SDP A2 is changed because the communication endpoint 101A has to use a different IP address because it is now communicating on a different network 110N.

The SIP INVITE with replaces header message of step 204 is being used differently than is typical. Typically, in SIP, the SIP INVITE with replaces header message is used to transfer a communication session. In this case, the SIP INVITE with replaces header message of step 204 is being used to reestablish a communication session.

In response to receiving the SIP INVITE with replaces header message in step 204, the application 122 sends a SIP Re-INVITE message using the SDP A2 in step 206. The SDP A2 includes the IP address of the communication endpoint 101N on the network 110A (which has failed) because the application 122 already learned that the original flow is broken because the communication endpoint 101A has included a new SDP offer. Therefore, the application 122 cannot use the old SDP offer (used to establish the media stream in step 200) in the Re-INVITE message of step 206. The application 122 sends the SIP Re-INVITE of step 206 because it does not know at this point that it cannot communicate with the communication endpoint 101N on the network 110A. Since the IP address of the communication endpoint 101 on the network 110A (in the SDP N1) is unreachable, there is no response to the SIP Re-INVITE message of step 206.

In the mean time, the communication endpoint 101N also sends, on the network 110N, a SIP INVITE with replaces header message to the application 122 in step 208. The SIP INVITE with replaces header message of step 208 includes the new SDP N2. The new SDP N2 includes the IP address of the communication endpoint 101N on the network 110N. The IP address of the communication endpoint 101N in the SDP N2 is changed because the communication endpoint 101N has to use a different IP address because it is now communicating on a different network 110N.

In response to receiving the SIP INVITE with replaces header message of step 208, the application 122 sends a SIP 480 temporarily unavailable message, in step 210, to the communication endpoint 101N. The SIP 480 temporarily unavailable message includes a SIP retry with no SDP. The SIP 480 temporarily unavailable message contains information that instructs the communication endpoint 101N to retry sending the SIP INVITE with replaces header message of step 208 with no SDP in it. For example the information that instructs the communication endpoint to retry sending the SIP INVITE with replaces header message of step 208 may be in a proprietary header, a proprietary parameter, in a reason code, and/or the like. The SIP retry with no SDP allows a communication channel to be initially setup and then later on negotiate a media stream using SDP. The SIP retry with no SDP may be part of a non-standard SIP header that contains information that the communication endpoint 101N uses in order to know to send the SIP INVITE with replaces header message with no SDP in step 212. The SIP retry with no SDP may be in various places in the SIP 480 temporarily unavailable message of step 210.

In one embodiment, the SIP 480 temporarily unavailable message of step 210 is sent based on receiving both SIP INVITE with replaces header messages (of steps 204 and 208). By receiving both the SIP INVITE with replaces header messages (of steps 204 and 208), the application 122 knows that both the communication endpoints 101A-101N are using new IP addresses.

In response to receiving the SIP 480 temporarily unavailable message of step 210, the communication endpoint 101N resends the SIP INVITE with replaces header message of step 208 without the SDP N2 in step 212. In response, the application 122 sends, in step 214, a SIP 200 OK message with the SDP A2 (received in step 204 with the communication endpoint 101A's changed IP address). The communication endpoint 101N responds, in step 216, by sending a SIP ACK message with the SDP N2 (with the communication endpoint 101N's changed IP address). The application 122 sends the SIP 200 OK message with the SDP N2 to the communication endpoint 101A in step 218. The communication endpoint 101A sends a SIP ACK message, in step 220, to the application 122.

At this point, the communication endpoints 101A-101N now know the other communication endpoint's respective IP address. This allows the media stream 200 to be reestablished using the SDP A2/SDP N2 in step 222 using RTP.

FIG. 3 is a flow diagram of a second process for preserving SIP communications. A media stream 300 is established between the communication endpoint 101A and the communication endpoint 101N on the network 110A. In this example, the communication endpoint 101A uses SDP A1. The SDP A1 includes the IP address of the communication endpoint 101A on the network 110A. The communication endpoint 101N uses SDP N1. The SDP N1 includes the IP address of the communication endpoint 101N on the network 110A.

The media stream 300 is shown in FIG. 3 as being a direct communication between the communication endpoint 101A and the communication endpoint 101N. However, in some embodiments, the media stream 300 may flow between the communication endpoint 101A and the communication endpoint 101N via the application 122.

The network 110A fails in step 302. The failure of the network 110A, in step 302, causes the SIP signaling channel between the communication endpoints 101A-101N to fail because the communication endpoints 101A-101N can no longer communicate by sending SIP messaging to the session manager 120. In addition, the media stream 200 will likely fail.

Since the communication endpoints 101A-101N can communicate on both the networks 110A-110N, the communication endpoint 101N tries to reestablish the communication channel (both signaling and media) between the communication endpoint 101A and the communication endpoint 101N. In this example, since the application 122 was part of the communication session, the communication endpoint 101A sends, on the network 110N, a SIP INVITE with replaces header message to the application 122 in step 304. The SIP INVITE with replaces header message of step 304 includes a new SDP A2. The new SDP A2 includes the IP address of the communication endpoint 101A on the network 110N. The IP address of the communication endpoint 101A in the SDP A2 is changed because the communication endpoint 101A has to use a different IP address because it is now communicating on a different network 110N.

The SIP INVITE with replaces header message of step 304 is being used differently than is typical. Typically, in SIP, the SIP INVITE with replaces header message is used to transfer a communication session. In this case, the SIP INVITE with replaces header message of step 304 is being used to reestablish a communication session.

In response to receiving the SIP INVITE with replaces header message in step 304, the application 122 sends a SIP Re-INVITE message using the SDP A2 in step 306. The SDP A2 includes the IP address of the communication endpoint 101N on the network 110A (which has failed) because the application 122 already learned that the original flow is broken because the communication endpoint 101A has included a new SDP offer. Therefore, the application 122 cannot use the old SDP offer (used to establish the media stream in step 300) in the Re-INVITE message of step 306. This is because the application 122 does not know at this point that it cannot communicate with the communication endpoint 101N on the network 110A. Since the IP address of the communication endpoint 101N on the network 110A (in the SDP N1) is unreachable, there is no response to the SIP Re-INVITE message of step 306. In the mean time, the communication endpoint 101N also sends, on the network 110N, a SIP INVITE with replaces header message to the application 122 in step 308. The SIP INVITE with replaces header message of step 308 includes the new SDP N2. The new SDP N2 includes the IP address of the communication endpoint 101N on the network 110N. The IP address of the communication endpoint 101N in the SDP N2 is changed because the communication endpoint 101N has to use a different IP address because it is now communicating on a different network 110N.

In response to receiving the SIP INVITE with replaces header message of step 308, the application 122 sends, in step 310, a SIP 200 OK message with a fabricated SDP answer to the communication endpoint 101A. The fabricated SDP is a placeholder that is used to reestablish a SIP dialog between the communication endpoint 101A and the application 122.

In addition to the fabricated SDP answer, the SIP 200 OK message of step 310 includes a SDP send only parameter. The SDP send only parameter is part of the SDP specification described in "An Offer/Answer Model with the Session Description Protocol (SDP)," RFC 3264, June 2002, which is incorporated herein in its entirety. RFC 3264 states that [i]f the offerer wishes to only send media on a stream to its peer, it MUST mark the stream as sendonly with the "a=sendonly" attribute." In other words, the 200 OK message of step 310 with the a=sendonly parameter would normally be used to place the communication endpoint 101A on hold (i.e., by not having the communication endpoint 101A send media). However, in this case, the send only parameter is being used for a completely different purpose; the purpose is to stop the communication endpoint 101A from trying to send media using the fabricated SDP answer (which would clearly fail).

In response to receiving the SIP 200 OK message of step 310, the communication endpoint 101A sends, in step 312, a SIP ACK message to the application 122. The application 122 sends, in step 314, a SIP Re-INVITE message with the SDP N2 (received in step 308) to the communication endpoint 101A. The SDP N2 in the SIP Re-INVITE of step 314 replaces the fabricated SDP answer sent in step 310. The communication endpoint 101A responds by sending, in step 316, a SIP 200 OK with the SDP A2 to the application 122. The application 122 sends, in step 318, the SIP 200 OK with the SDP A2 to the communication endpoint 101N. The application 122 sends a SIP ACK (acknowledging the 200 OK message of step 316) to the communication endpoint 101A in step 320. The communication endpoint 101N sends a SIP ACK message (acknowledging the 200 OK message of step 318) to the application 122 in step 322.

At this point, the communication endpoints 101A-101N now know the other communication endpoint's respective IP address. This allows the media stream 300 to be reestablished using the SDP A2/SDP N2 in step 324 using RTP.

FIG. 4 is a flow diagram of a third process for preserving SIP communications. A media stream 400 is established between the communication endpoint 101A and the communication endpoint 101N on the network 110A. In this example, the communication endpoint 101A uses SDP A1. The SDP A1 includes the IP address of the communication endpoint 101A on the network 110A. The communication endpoint 101N uses SDP N1. The SDP N1 includes the IP address of the communication endpoint 101N on the network 110A.

The media stream 400 is shown in FIG. 4 as being a direct communication between the communication endpoint 101A and the communication endpoint 101N. However, in some embodiments, the media stream 400 may flow between the communication endpoint 101A and the communication endpoint 101N via the application 122.

The network 110A fails in step 402. The failure of the network 110A, in step 402, causes the SIP signaling channel between the communication endpoints 101A-101N to fail because the communication endpoints 101A-101N can no longer communicate by sending SIP messaging to the session manager 120. In addition, the media stream 200 will likely fail.

Since the communication endpoints 101A-101N can communicate on both the networks 110A-110N, the communication endpoint 101N tries to reestablish the communication channel (both signaling and media) between the communication endpoint 101A and the communication endpoint 101N. In this example, since the application 122 was part of the communication session, the communication endpoint 101A sends, on the network 110N, a SIP INVITE with replaces header message to the application 122 in step 404. The SIP INVITE with replaces header message of step 404 includes a new SDP A2. The new SDP A2 includes the IP address of the communication endpoint 101A on the network 110N. The IP address of the communication endpoint 101A in the SDP A2 is changed because the communication endpoint 101A has to use a different IP address because it is now communicating on a different network 110N.

The SIP INVITE with replaces header message of step 404 is being used differently than is typical. Typically, in SIP, the SIP INVITE with replaces header message is used to transfer a communication session. In this case, the SIP INVITE with replaces header message of step 404 is being used to reestablish a communication session.

In response to receiving the SIP INVITE with replaces header message in step 404, the application 122 sends a SIP Re-INVITE message using the SDP A2 in step 406. The SDP A2 includes the IP address of the communication endpoint 101A on the network 110A (which has failed) because the application 122 already learned that the original flow is broken because the communication endpoint 101A has included a new SDP offer. Therefore, the application 122 cannot use the old SDP offer (used to establish the media stream in step 400) in the Re-INVITE message of step 406. This is because the application 122 does not know at this point that it cannot communicate with the communication endpoint 101N on the network 110A. Since the IP address of the communication endpoint 101N on the network 110A (in the SDP N1) is unreachable, there is no response to the SIP Re-INVITE message of step 406. In the mean time, the communication endpoint 101N also sends, on the network 110N, a SIP INVITE with replaces header message to the application 122 in step 408. The SIP INVITE with replaces header message of step 408 includes the new SDP N2. The new SDP N2 includes the IP address of the communication endpoint 101N on the network 110N. The IP address of the communication endpoint 101N in the SDP N2 is changed because the communication endpoint 101N has to use a different IP address because it is now communicating on a different network 110N.

In response to receiving the SIP INVITE with replaces header message of step 408, the application 122 sends, in step 410, a SIP 200 OK message with a fabricated SDP answer and the SDP send only parameter (similar to step 310) to the communication endpoint 101A. The application 122 also sends, in step 412, a SIP 200 OK message with the fabricated SDP answer and the send only parameter to the communication endpoint 101N. In addition, the SIP 200 OK message of step 412 includes a parameter that instructs the communication endpoint 101N to send a SIP Re-INVITE message with the SDP N2.

The communication endpoint 101A sends, in step 414, a SIP ACK message (to acknowledge the SIP 200 OK of step 410) to the application 122. In response to receiving the SIP 200 OK of step 412 the communication endpoint 101N sends, in step 416, a SIP Re-INVITE message with the SDP N2 to the application 122. The application 122 sends the SIP Re-INVITE of step 416 to the communication endpoint 101A in step 418. The communication endpoint 101A responds by sending, in step 420, a SIP 200 OK message with the SDP A2 to the application 122. The application 122 sends, in step 422, the SIP 200 OK message with the SDP A2 to the communication endpoint 101N. The application 122 sends, in step 424, a SIP ACK message (in response to the SIP 200 OK of step 420) to the communication endpoint 101A. The communication endpoint 101N sends, in step 426, a SIP ACK message (in response to the SIP 200 OK message of step 422) to the application 122.

At this point, the communication endpoints 101A-101N now know the other communication endpoint's respective IP address. This allows the media stream 400 to be reestablished using the SDP A2/SDP N2 in step 428 using RTP.

The above descriptions describe where the IP address changes for both communication endpoints 101A-101N based on the failure of the network 110A. However, the above descriptions will also work in a similar manner if the network 110N failed.

The above descriptions describe where both networks are wireless. However, in some embodiments, one or both of the networks 110A-110N may be a wired or optical network.

In one embodiment, when the network 110A fails, the communication endpoint 101A may send the SIP INVITE with replaces header message (of steps 204, 304, or 404) on the network 110N. The communication endpoint 101N may send the SIP INVITE with replaces header message (of steps 208, 308, or 408) on a different network. For example, the communication endpoint 101N may send the SIP INVITE with replaces header message on the network 110B (not shown) because the communication endpoint 101N may have a network interface 103 connected to the network 110B instead of the network 110N.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this disclosure have been described in relation to electronic networks. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
   a microprocessor; and
   a computer readable medium, coupled with the microprocessor and comprising microprocessor readable and executable instructions that cause the microprocessor to execute:
      a communication application that:
         receives a first Session Initiation Protocol (SIP) INVITE with replaces header message from a first communication endpoint, wherein the first SIP INVITE with replaces header message comprises a first Session Description Protocol (SDP) offer that is based on a first changed network address of the first communication endpoint;
         receives a second SIP INVITE with replaces header message from a second communication endpoint, wherein the second SIP INVITE with replaces header message comprises a second SDP offer that is based on a second changed network address of the second communication endpoint and wherein the first communication endpoint and the second communication endpoint had an established media stream; and
         sends a first SIP 200 OK message with a first fabricated SDP answer to the first communication endpoint in response to receiving the second SIP INVITE with replaces header message.

2. The system of claim 1, wherein the first SIP 200 OK message comprises a SDP a=sendonly parameter, and wherein the SDP a=sendonly parameter is sent to stop the first communication endpoint from trying to send media using the fabricated SDP answer.

3. The system of claim 1, wherein the communication application receives a first SIP ACK message from the first communication endpoint, sends a SIP Re-INVITE message to the first communication endpoint, wherein the SIP Re-INVITE message comprises a second SDP answer, and receives a second SIP 200 OK message from the first communication endpoint, wherein the second SIP 200 OK message comprises a second SDP answer.

4. The system of claim 3, wherein the communication application sends the second SIP 200 OK message to the second communication endpoint comprising the first SDP answer from the first communication endpoint, sends a second SIP ACK message to the first communication endpoint, and receives a third SIP ACK message from the second communication endpoint.

5. The system of claim 1, wherein the communication application sends a SIP Re-INVITE message to the second communication endpoint in response to receiving the first SIP INVITE with replaces header message from the first communication endpoint, and wherein the SIP Re-INVITE message comprises a SDP offer based the first SDP Offer.

6. The system of claim 1, wherein the communication application sends a second SIP 200 OK message with a second fabricated SDP answer to the second communication endpoint in response to receiving the second SIP INVITE with replaces header message from the second communication endpoint, receives, a first SIP ACK message from the first communication endpoint, and receives a SIP Re-INVITE message from the second communication endpoint, wherein the SIP Re-INVITE message comprises the second SDP offer.

7. The system of claim 6, wherein in the communication application sends a third SIP 200 OK message with the second fabricated SDP answer to the first communication endpoint, wherein the second SIP 200 OK message comprises a SIP Retry-After header and a SDP a=sendonly parameter, and wherein the SDP a=sendonly parameter is sent to stop the communication endpoint from trying to send media using the fabricated SDP answer.

8. The system of claim 6, wherein the communication application sends the SIP Re-INVITE message comprising the second SDP offer to the first communication endpoint, receives a third SIP 200 OK message from the first communication endpoint, and sends the third SIP 200 OK message to the second communication endpoint.

9. The system of claim 1, wherein the first and second SIP INVITE replaces header messages are sent based on a failure of the established media stream.

10. The system of claim 1, wherein the sending the first SIP 200 OK message with the first fabricated SDP answer is based on receiving both the first and second SIP INVITE with replaces header messages.

11. A method comprising:
    receiving, by a microprocessor, a first Session Initiation Protocol (SIP) INVITE with replaces header message from a first communication endpoint, wherein the first SIP INVITE with replaces header message comprises a first Session Description Protocol (SDP) offer that is based on a first changed network address of the first communication endpoint;
    receiving, by the microprocessor, a second SIP INVITE with replaces header message from a second communication endpoint, wherein the second SIP INVITE with replaces header message comprises a second SDP offer that is based on a second changed network address of the second communication endpoint and wherein the first communication endpoint and the second communication endpoint had an established media stream; and
    in response to receiving the second SIP INVITE with replaces header message, sending, by the microprocessor, a first SIP 200 OK message with a first fabricated SDP answer to the first communication endpoint.

12. The method of claim 11, wherein the first SIP 200 OK message comprises a SDP a=sendonly parameter, and wherein the SDP a=sendonly parameter is sent to stop the first communication endpoint from trying to send media using the first fabricated SDP answer.

13. The method of claim 11, further comprising:
    receiving, by the microprocessor, a first SIP ACK message from the first communication endpoint;
    sending, by the microprocessor, a SIP Re-INVITE message to the first communication endpoint, wherein the SIP Re-INVITE message comprises the second SDP offer; and
    receiving, by the microprocessor, a second SIP 200 OK message from the first communication endpoint, wherein the second SIP 200 OK message comprises the second SDP answer.

14. The method of claim 13, further comprising:
sending, by the microprocessor, the second SIP 200 OK comprising the first SDP answer from the first communication endpoint message to the second communication endpoint;
sending, by the microprocessor, a second SIP ACK message to the first communication endpoint; and
receiving, by the microprocessor, a third SIP ACK message from the second communication endpoint.

15. The method of claim 11, further comprising:
in response to receiving the second SIP INVITE with replaces header message from the second communication endpoint, sending, by the microprocessor, a second SIP 200 OK message with a second fabricated SDP answer to the second communication endpoint, wherein the second SIP 200 OK message comprises a SIP Retry-After header and a SDP a=sendonly parameter;
receiving, by the microprocessor, a first SIP ACK message from the first communication endpoint; and
receiving, by the microprocessor, a SIP Re-INVITE message from the second communication endpoint, wherein the SIP Re-INVITE message comprises the second SDP offer.

16. The method of claim 15, wherein
sending, by the microprocessor, the SIP Re-INVITE message to the first communication endpoint;
receiving, by the microprocessor, a third SIP 200 OK message from the first communication endpoint, wherein the third SIP 200 OK message comprises the first SDP offer; and
sending, by the microprocessor, the third SIP 200 OK message to the second communication endpoint.

17. The method of claim 11, wherein the sending the first SIP 200 OK message with the first fabricated SDP answer is based on receiving both the first and second SIP INVITE with replaces header messages.

18. A system comprising:
a microprocessor; and
a computer readable medium, coupled with the microprocessor and comprising microprocessor readable and executable instructions that program the microprocessor to:
receive a first Session Initiation Protocol (SIP) INVITE with replaces header message from a first communication endpoint, wherein the first SIP INVITE with replaces header message comprises a first Session Description Protocol (SDP) offer that is based on a first changed network address of the first communication endpoint;
receive a second SIP INVITE with replaces header message from a second communication endpoint, wherein the second SIP INVITE with replaces header message comprises a second SDP offer that is based on a second changed network address of the second communication endpoint and wherein the first communication endpoint and the second communication endpoint had an established media stream; and
sends a SIP 480 temporarily unavailable message that does not comprise a SDP offer to the second communication endpoint in response to receiving the second SIP INVITE with replaces header message.

19. The system of claim 18, wherein the microprocessor receives a third SIP INVITE with replaces header message from the second communication endpoint, wherein the third SIP INVITE with replaces header message does not comprise a SDP offer and sends a first SIP 200 OK message to the second communication endpoint, wherein the first SIP 200 OK message comprises the first SDP offer.

20. The system of claim 18, wherein the microprocessor receives a first SIP ACK message from the second communication endpoint, wherein the first SIP ACK message comprises the second SDP offer, sends the first SIP ACK message to the first communication endpoint, and receives a second SIP ACK message from the first communication endpoint.

* * * * *